(12) United States Patent
Zeng et al.

(10) Patent No.: US 7,070,752 B2
(45) Date of Patent: Jul. 4, 2006

(54) SUPPORTED PEROVSKITE-TYPE OXIDES AND METHODS FOR PREPARATION THEREOF

(75) Inventors: Yongxian Zeng, Edison, NJ (US); Rudolph J. Wolf, Lebanon, NJ (US); Frank R. Fitch, Bedminster, NJ (US); Martin Bülow, Watchung, NJ (US); Satish S. Tamhankar, Scotch Plains, NJ (US); Divyanshu R. Acharya, Bridgewater, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 105 days.

(21) Appl. No.: 11/038,610

(22) Filed: Jan. 19, 2005

(65) Prior Publication Data

US 2005/0164890 A1   Jul. 28, 2005

Related U.S. Application Data

(62) Division of application No. 10/135,087, filed on Apr. 29, 2002, now abandoned.

(60) Provisional application No. 60/287,924, filed on May 1, 2001.

(51) Int. Cl.
*C01B 31/18* (2006.01)
*C01B 3/26* (2006.01)

(52) U.S. Cl. .................. 423/418.2; 252/373; 423/652; 423/654

(58) Field of Classification Search ............... 252/373; 423/418.2, 652, 653, 654
See application file for complete search history.

(56) References Cited

U.S. PATENT DOCUMENTS

| 2,507,502 | A | 5/1950 | Coner et al. |
| 4,321,250 | A | 3/1982 | Hart |
| 5,112,590 | A | 5/1992 | Krishnamurthy et al. |
| 5,149,516 | A | 9/1992 | Han et al. ................ 252/373 |

(Continued)

FOREIGN PATENT DOCUMENTS

EP           0 399 833 A1      11/1990

(Continued)

OTHER PUBLICATIONS

D. Klvana, J. Kirchnerova, J. Chaouki, J. Delval, W. Yaïci, "Fiber-Supported Perovskites for Catalytic Combustion of Natural Gas," CATALYSIS TODAY, vol. 47, 1999, pp. 115-121, no month.

(Continued)

*Primary Examiner*—Wayne A. Langel
(74) *Attorney, Agent, or Firm*—Philip H. Von Neida (57) ABSTRACT

Supported perovskite-type oxides are described. The perovskite-type oxides have the general formula of $A_xA'_{x'}B_yB'_{y'}O_{3-\delta}$, wherein A is an ion of a metal of Group IIIa or IIIb of the periodic table of elements or mixtures thereof; A' is an ion of a metal of Groups Ia or IIa of the periodic table or mixtures thereof; B and B' are ions of a d-block transition metal of the periodic table or mixtures thereof; x, x', y and y' vary from 0 to 1; $0.95 < x+x' < 1.05$; $0.95 < y+y' < 1.05$; $\delta$ is the deviation from ideal oxygen stoichiometry. This invention also provides for the selection of support materials and the shapes of supported perovskite-type oxides as well as the methods for making them.

29 Claims, 4 Drawing Sheets

U.S. PATENT DOCUMENTS

| | | |
|---|---|---|
| 5,160,713 A | 11/1992 | Mazanec et al. |
| 5,356,728 A | 10/1994 | Balachandran et al. |
| 5,447,765 A | 9/1995 | Petit et al. ............ 252/373 |
| 5,538,706 A | 7/1996 | Kapoor et al. |
| 5,571,492 A | 11/1996 | Yao et al. |
| 5,693,212 A | 12/1997 | Mazanec et al. |
| 5,714,091 A | 2/1998 | Mazanec et al. |
| 5,744,015 A | 4/1998 | Mazanec et al. |
| 5,755,840 A | 5/1998 | Beer |
| 5,980,840 A | 11/1999 | Kleefisch et al. ......... 252/373 |
| 5,981,445 A | 11/1999 | Kirchnerova et al. |
| 6,110,979 A | 8/2000 | Nataraj et al. |
| 6,143,203 A * | 11/2000 | Zeng et al. ............ 252/373 |
| 6,235,417 B1 | 5/2001 | Wachsman et al. ...... 252/373 |
| 6,238,816 B1 * | 5/2001 | Cable et al. ............ 429/17 |
| 6,379,586 B1 * | 4/2002 | Zeng et al. ............ 423/418.2 |
| 6,409,940 B1 | 6/2002 | Gaffney et al. ......... 252/373 |
| 6,464,955 B1 | 10/2002 | Zeng et al. ............ 252/373 |
| 6,695,983 B1 * | 2/2004 | Prasad et al. .......... 252/373 |
| 6,761,838 B1 * | 7/2004 | Zeng et al. ............ 252/373 |

| | | |
|---|---|---|
| 2002/0010220 A1 | 1/2002 | Zeng et al. |

FOREIGN PATENT DOCUMENTS

| | | |
|---|---|---|
| EP | 0 585 860 A2 | 3/1994 |
| EP | 0 592 809 A1 | 4/1994 |
| EP | 0 663 231 A2 | 7/1995 |
| EP | 0 913 184 A1 | 5/1999 |
| EP | 0 995 715 A1 | 4/2000 |
| EP | 0 044 924 A1 | 10/2000 |
| JP | 5-4044 | 1/1993 |

OTHER PUBLICATIONS

Patent Abstracts of Japan, vol. 017, No. 266 (C-1062), May 25, 1993 & J P 05 005044A (Toyoda Gosei Co. Ltd), Jan. 14, 1993 abstract.

Patent Abstracts of Japan, vol. 016, No. 461 (C-0983), Sep. 25, 1992 & J P 04 164803 A (Osaka Gas Co. Ltd.), Jun. 10, 1992 abstract.

* cited by examiner

SUPPORTED PEROVSKITE-TYPE OXIDES AND METHODS FOR PREPARATION THEREOF

CROSS REFERENCE TO RELATED APPLICATION

This application is a divisional of U.S. patent application Ser. No. 10/135,087 filed Apr. 29, 2002 now abandoned, which was filed from U.S. Provisional Patent Application Ser. No. 60/287,924 on May 1, 2001.

FIELD OF THE INVENTION

This invention relates generally to supported perovskite-type oxides, for hydrocarbon oxidation, steam methane reforming, auto-thermal reforming, cyclical auto-thermal reforming (CAR) and high temperature air separation. More particularly, this invention relates to perovskite-type oxides displaying significant oxygen storage capability and high oxygen exchange rate at high temperature. Even more particularly, the present invention relates to the methods of making the supported perovskite-type oxides having the general formula of $A_xA'_{x'}B_yB'_{y'}O_{3-\delta}$.

BACKGROUND OF THE INVENTION

Most perovskite-type ceramic materials with a general formula of $ABO_{3-\delta}$ are mixed electronic and oxygen ion conductors at high temperature and are known to be suitable materials for making dense oxygen semi-permeable membranes. These membranes hold promising applications in air separation and partial oxidation of hydrocarbons to hydrogen and carbon monoxide. Despite tremendous interest and efforts from both academic institutes and industrial companies, the applications of dense ceramic membranes made of perovskite-type oxides are still facing many technical challenges. These include fabrication of pin-hole free dense membranes, developing high temperature sealing and joining techniques to integrate a particular membrane with other parts of the reactor system, and controlling the chemical and mechanical stability of the membrane during the harsh operating conditions. In addition, there are issues related to safety and economy of ceramic membrane reactor applications.

It has been discovered by the present inventors that perovskite-type oxides in non-membrane form exhibit both good oxygen storage capability and/or catalytic properties for high-temperature air separation, total combustion, partial oxidation and steam reforming reactions. Historically, perovskite-type oxides in non-membrane form for a high-temperature air separation process as well as in a cyclic auto-thermal reforming (CAR) process have been disclosed. In the CAR process, air and natural gas/steam mixture are contacted alternately with perovskite-type oxides. The present inventors have further discovered that perovskite-type oxides, when supported by porous support, show higher reactivity and faster oxygen exchange rate than the unsupported ones.

SUMMARY OF THE INVENTION

The present invention relates to perovskite-type oxides in non-membrane form with high oxygen-storage capability and oxygen exchange rate at high temperature while having good catalytic properties for oxidation reactions. Further, the present invention provides for supported perovskite-type oxides with improved performance compared to that of the unsupported ones. These supported perovskite-type oxides are particularly useful for high temperature air separation processes, via pressure swing adsorption (PSA) or thermal swing adsorption (TSA), and for the conversion of hydrocarbons into products that contain hydrogen and carbon monoxide, via partial oxidation, steam reforming, or auto-thermal reforming, in continuous or cyclical operations (CAR process). Methods for making supported perovskite-type oxides also forms part of the present invention.

The perovskite-type oxides having a general formula of $A_{1-x}A'_xB_{1-y}B'_yO_{3-\delta}$, where A is an ion of a metal of Groups IIIa or IIIb of the periodic table of elements; A' is an ion of a metal of Groups Ia or IIa of the periodic table; B and B' are ions of a d-block transition metal of the periodic table; x and y vary from 0 to 1.05; δ is the deviation from ideal oxygen stoichiometry. The perovskite-type materials can be A-site or B-site rich compositions as long as the perovskite phase structure is maintained. For a general composition of $A_xA'_{x'}B_yB'_{y'}O_{3-\delta}$, A-site rich means x+x'>1 while y+y'< or =1, and B-site rich means x+x'< or =1 while y+y'>1.

In a preferred embodiment, the perovskite-type oxides have A-sites containing La and Sr ions and B-sites containing Ni, Co and Fe ions. In a more preferred embodiment, the perovskite-type oxides have a formula of $La_xSr_{x'}Ni_yCo_{y'}Fe_{y''}O_{3-\delta}$, in which x, x', y, y' and y" are all smaller than 1.05 but greater than 0. In the most preferred embodiment, the perovskite-type oxides have a formula of $La_xSr_{x'}Ni_yCo_{y'}Fe_{y''}O_{3-\delta}$, in which 0.5<x<1, 0.1<x'<0.5, 0.2<y<0.8, 0.2<y'<0.6 and 0.1<y"<0.5.

In a preferred embodiment, the perovskite-type oxides have particle sizes in the range of about 0.01 to 100 microns. In a more preferred embodiment, the perovskite-type oxides have particle sizes in range of about 0.1 to 50 microns.

The present invention further comprises appropriate carriers that vary widely in their porosity, for supporting perovskite-type oxides. In a preferred embodiment, the support materials are selected from: (1) metal oxides such as alpha-$Al_2O_3$, gamma-$Al_2O_3$, eta-$Al_2O_3$, $ZrO_2$, MgO, $CeO_2$, CaO and $SiO_2$; (2) aluminates such as $MgAl_2O_4$ and $CaAl_2O_4$; (3) metal aluminum silicates such as cordierites; (4) metals such as porous high nickel containing alloy. In a more preferred embodiment, the support materials are selected from alpha-$Al_2O_3$, gamma-$Al_2O_3$ and eta-$Al_2O_3$ or mixtures thereof. In another more preferred embodiment, the support materials are selected from cordierites such as $Mg_2Al_3[AlSi_5O_{18}]$ and $Fe_2Al_3[AlSi_5O_{18}]$, or related derivatives stable at high temperature. In yet another more preferred embodiment, the support material is $MgAl_2O_4$. The thermal expansion properties of the supports have to be controlled carefully to ensure stability of the final product with regard to temperature changes.

In a preferred embodiment, the supported perovskite-type oxides can be further coated on one or more other support materials to achieve an increase in performance, and enhancement of thermal and mechanical properties.

In another preferred embodiment of the present invention, the support material has particle sizes in the range of about 0.1 to 10,000 microns. In a more preferred embodiment, the support material has particle sizes in the range of about 5 to 1,000 microns.

The present invention also provides for methods of preparing supported perovskite-type oxides. The methods comprise dispersing perovskite-type oxides onto the selected support with or without the aid of a liquid solvent. The methods further comprise treating the mixture of perovskite-type oxide and support at a high temperature to form close bonding between adjacent particles of perovskite-type oxides and the support.

Another object of the present invention is to provide the supported perovskite-type oxides with appropriate macroscopic particle shapes. In a preferred embodiment, the shapes of the supported perovskite-type oxides are selected from beads, rings, extrudates, pellets with any cross-sectional shapes with or without holes, honeycomb-type structures with uniform channels and monolithic ones with random porosity and/or foam structure. In a more preferred embodiment, the shapes of the supported perovskite-type oxides are selected from those of monolithic structures and extrudates particularly with cylindrical shape. The extrudates are formed by extrusion, particularly screw extrusion. Alternatively, there are various pressing procedures, which can be utilized to shape the perovskite-type oxides, and these procedures provide good mechanical stability of the resulting shaped material.

Appropriate additives will help the shape forming process and control the desired pore structure within the shape. In a preferred embodiment, the additives are selected from water, organic solvents, cellulose, polymers, synthetic and naturally formed fibers, starch and metal oxides. In a more preferred embodiment, the additives are water, various types of cellulose with particle sizes compatible with those of the components to be shaped, about 0.1 to 1 wt % MgO and about 0.1 to 0.5 wt % $TiO_2$.

DETAILED DESCRIPTION OF THE INVENTION

The present invention relates to a composition of perovskite-type materials supported by a solid carrier, methods for fabricating the perovskite-type material on the carrier and their use in high-temperature air separation, total combustion, partial oxidation and steam reforming reactions. The perovskite-type materials have a general formula of $A_{1-x}A'_xB_{1-y}B'_yO_{3-\delta}$, where A is an ion of a metal of Group IIIa and IIIb of the periodic table of elements; A' is an ion of a metal of Groups Ia and IIa of the periodic table; B and B' are ions of a d-block transition metal of the periodic table; x and y vary from 0 to 1.05; $\delta$ is the deviation from ideal oxygen stoichiometry. The perovskite-type materials can be A-site or B-site rich compositions as long as the perovskite phase structure is maintained. For a general composition of $A_xA'_xB_yB'_yO_{3-\delta}$, A-site rich means x+x'>1 while y+y'< or =1, and B-site rich means x+x'< or =1 while y+y'>1. In general, most perovskite-type oxides have certain oxygen storage and catalytic properties. It was found that the compositions of perovskite-type oxides were critical to their oxygen storage capacity and catalytic properties. For example, the perovskite-type oxides with A-site containing La and Sr ions and B-sites containing Ni, Co and Fe ions showed very good oxygen storage and catalytic properties for cyclic auto-thermal reforming (CAR) process.

The methods for synthesis of perovskite-type materials are well known in literature. The commonly used methods are: (1) solid-state reaction; (2) combustion synthesis; (3) citrate method; (4) co-precipitation method; (5) sol-gel method, and (5) spray-pyrolysis method. Although different synthesis methods may result in different particle sizes and surface properties, they produce the perovskite-type oxides with the same phase structure, i.e. perovskite-type structure, which can be characterized by X-ray diffraction measurement. The appropriate particle sizes of perovskite-type oxide powders for making supported perovskite-type oxides are in the range of 0.01 to 100 microns.

The requirement on the support materials include: (1) resistant to high temperature, i.e., 600 to 1200° C.; (2) maintaining appropriate pore structure at high temperature; (3) good affinity for perovskite-type oxides but not having significant reactions with perovskite-type oxides; (4) good mechanical strength at both low and high temperatures; (5) low thermal expansion. The suitable support materials include: (1) metal oxides such as alpha-$Al_2O_3$, gamma-$Al_2O_3$, eta-$Al_2O_3$, $ZrO_2$, TiO2, MgO, $CeO_2$, CaO and $SiO_2$; (2) aluminates such as $MgAl_2O_4$ and $CaAl_2O_4$; (3) metal aluminum silicates, such as cordierites; (4) metals such as porous high nickel containing alloy. The preferred selections are alpha-$Al_2O_3$, gamma-$Al_2O_3$ and eta-$Al_2O_3$ and mixtures thereof. The other class of preferred supports are cordierites such as $Mg_2Al_3[AlSi_5O_{18}]$ and $Fe_2Al_3[AlSi_5O_{18}]$, or related derivatives stable at high temperature. The particle size of the supports should be compatible with the particle size of the perovskite powder. The appropriate particle size range is about 1 to 10,000 microns.

In a preferred embodiment, the supported perovskite-type oxides can be further coated on one or more other support materials to achieve an increase in performance, thermal and mechanical properties. In another preferred embodiment, the supported perovskite-type oxides can be further coated or impregnated with metals selected from transition and noble metals, such as Rh, Pt, Ag, etc.

Once a perovskite-type powder has been synthesized and the support selected, the task is to coat the perovskite-type powder onto the support. The methods to do this include: (1) dry coating; and (2) wet coating. In dry coating, the perovskite-type powders and support particles are physically mixed together and uniformly distributed. This mixture is then subjected to high temperature sintering, resulting in strong bonding between the perovskite and the support. In wet coating method, both perovskite and support are dispersed in a liquid solvent to form a uniform suspension. The solid mixture after filtration is then dried and sintered. The wet coating method also includes sol-gel method in which the perovskite-type oxides (or precursors) are synthesized in a form of sol. The perovskite-type oxides in the form of sol are then coated or impregnated onto the support. The preferred coating method of this invention is that of dry coating.

It is necessary that the supported perovskite-type oxides are formed into appropriate shapes to achieve higher mass and heat transfer rates, higher surface area, enhanced resistance to attrition and fluidization compared to those features of the perovskite-type oxides without support. These shapes include beads, rings, extrudates, pellets with any cross-sectional shapes with or without holes, honeycomb structures with uniform channels and monolithic ones with random porosity and/or foam structure. The preferred shapes of this invention are extrudates and monolithic structures. The monolithic and honeycomb structures can be used either in a single piece or stacked pieces packed randomly in a reactor bed. There are many forming methods to fabricate those shaped structures, such as extrusion using dies with differently shaped channels, agglomeration, tape casting, foam casting, etc. The preferred shape forming method in this invention is extrusion, particularly screw extrusion. Alternatively, there are a number of pressing procedures which also provide good mechanical stability which can be utilized to shape the perovskite-type oxides.

In many cases, solvents, binders, sintering aids and pore-forming additives are added into the supported perovskite-type oxide powders before shaping the material. This is to optimize the plasticity of the materials and to control the green strength of the shaped material as well as to promote the sintering and to control the pore structure of the final products. These additives and aids include: water, organic solvents, various types of celluloses with particle sizes compatible with those of the components to be shaped, polymers, fibers of both synthetic and naturally formed, starches and small amount of metal oxides such as MgO and $TiO_2$. The selected combination and the amounts of these additives and aids are critical to achieve desired products. After shape forming, the green body is subjected to drying, calcination and sintering to remove the organic additives and gain good bonding and mechanical strength.

The pore size distribution and surface area of the supported perovskite-type oxides are critical to the performance. The preferred pore size and the surface area are respectively in the range of about 0.001 to 10 microns and a surface area in the range of about 1 to 200 $m^2/g$. In a preferred embodiment, the supported perovskite oxides have a pore size in the range of about 0.01 to 1 microns and a surface area in the range of about 1 to 50 $m^2/g$.

The following represent examples of making perovskite-type oxide powders and supported perovskite-type oxide extrudates: They should be considered merely as examples of the present invention and not as limiting the scope thereof.

EXAMPLE 1

Figure 1:
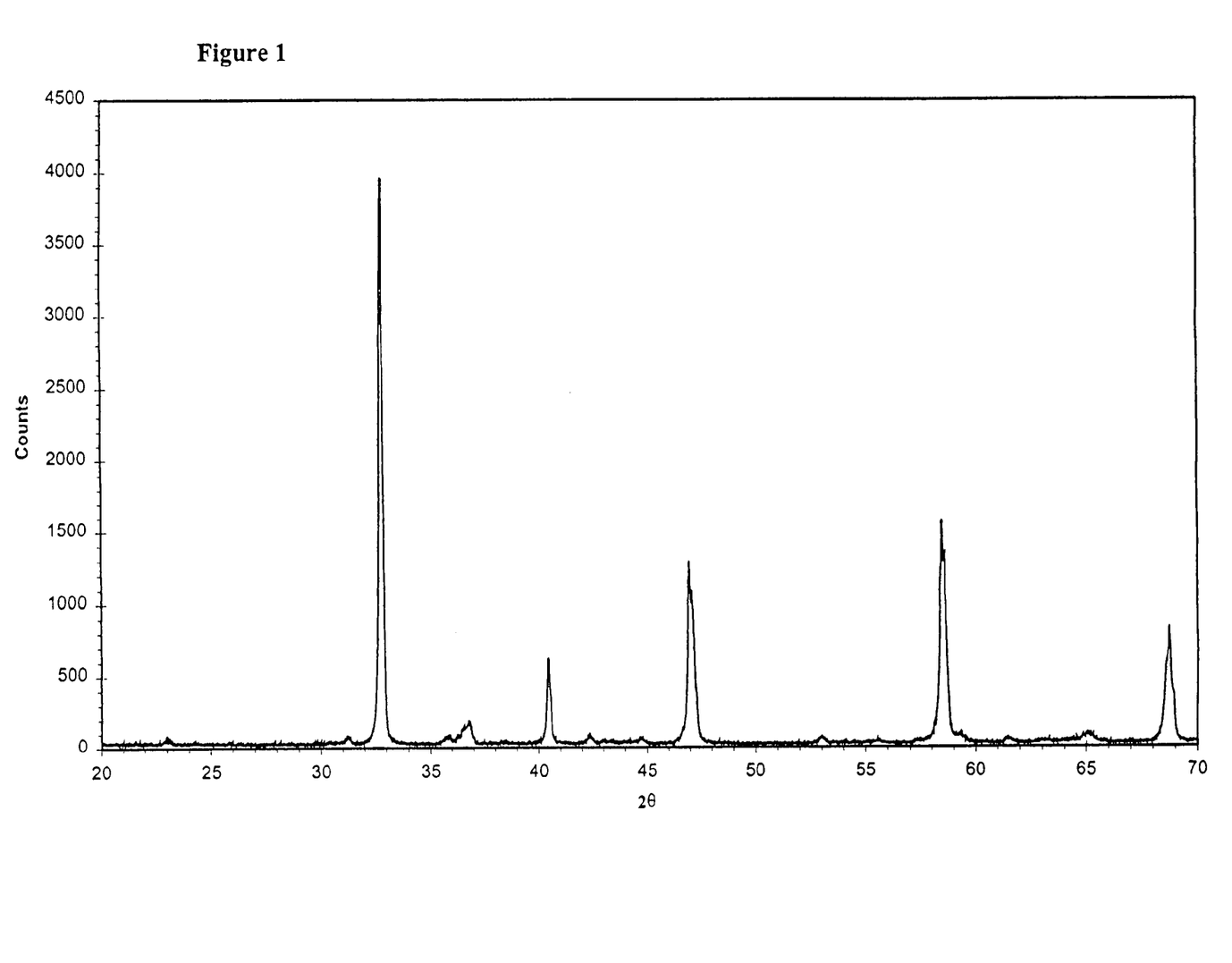
FIG. 1 shows an XRD pattern of the perovskite-type powder formed according to Example 1.

Preparation of 6.56 g $La_{0.5}Sr_{0.5}Co_{0.5}Fe_{0.5}O_{3-\delta}$ Perovskite-type Oxide by Co-precipitation Method The preparation started with respectively dissolving 4.87 g $La(NO_3)_3$, 3.17 g $Sr(NO3)2$, 4.36 g $Co(NO3)2.6H2O$, 6.06 g $Fe(NO3)3$ into 50 ml deionised water and 15.13 g oxalic acid into 100 ml deionised water. The above-made metal nitrate solution was dropped into above-made oxalic acid solution at a rate of 0.5 drop/second while stirring until finished. The solid precipitate was collected by filtration and dried at 100° C. overnight in an oven, and then placed in a furnace and heated up at 20° C./min up to 600° C. The solid was held at 600° C. for 1 hour, resulting in pyrolysis. The residual was calcined at 900° C. for 2 hours. The perovskite-type powder of $La_{0.5}Sr_{0.5}Co_{0.5}Fe_{0.5}O_{3-\delta}$ was thus produced. Its XRD pattern is shown in FIG. 1.

EXAMPLE 2

Figure 2:
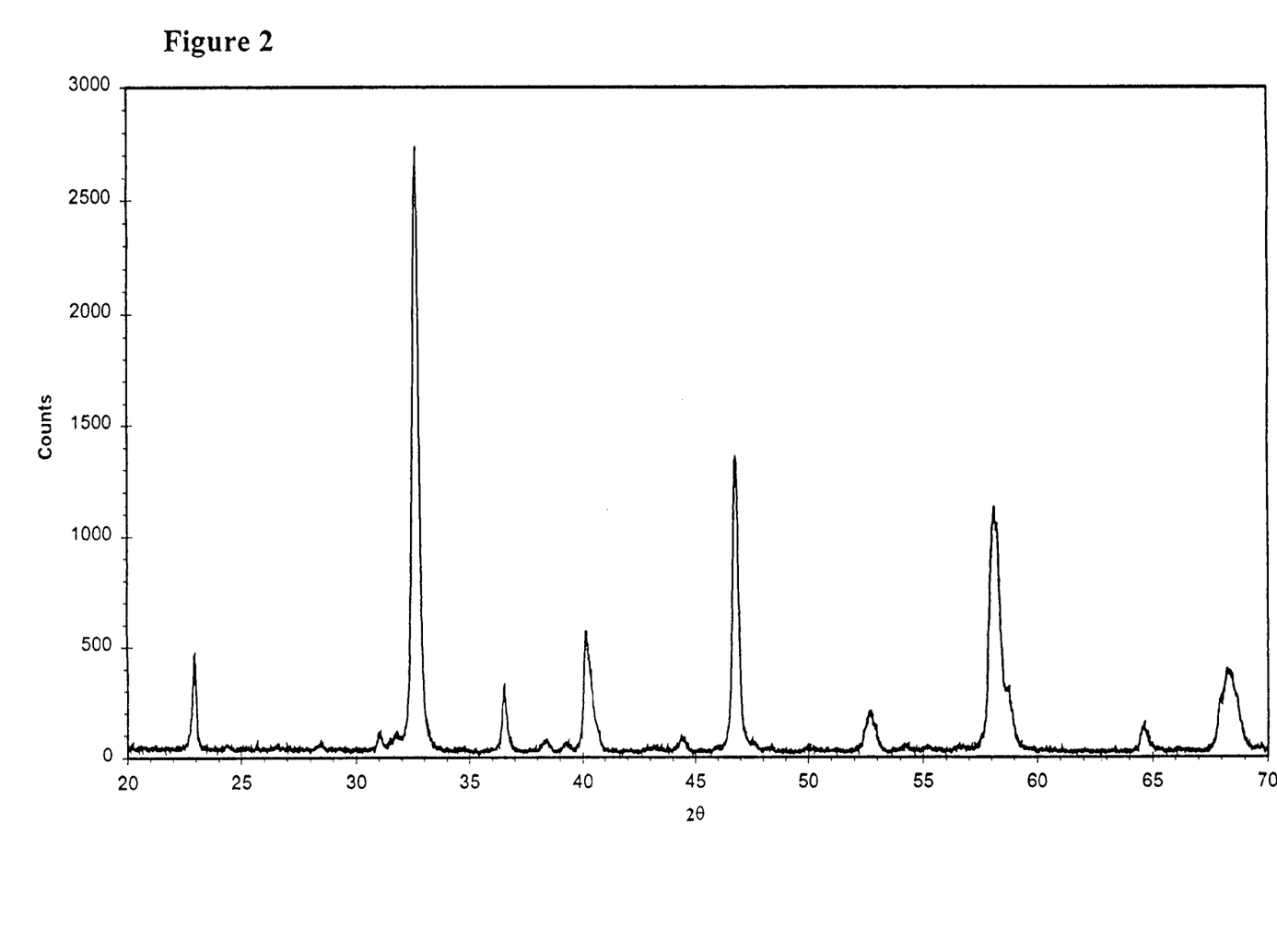
FIG. 2 shows an XRD pattern of the perovskite-type powder formed according to Example 2.

Preparation of 12.2 g $La_{0.2}Sr_{0.8}Co_{0.5}Fe_{0.5}O_{3-\delta}$ Perovskite-type Oxide by Citrate Method The preparation was started by dissolving 3.9 g $La(NO_3)_3$, 10.16 g $Sr(NO_3)_2$, 8.73 g $Co(NO_3)_2.6H2O$, 12.12 g $Fe(NO_3)_3$ into 800 ml dilute $HNO_3$ solution (720 ml deionised water and 80 ml concentrated $HNO_3$). 34.6 g citric acid was added to the above-made metal nitrate solution. The solution was then heated to 90–110° C. with reflux for 3 hours. After that, water was gradually removed from the solution by evaporation until a gel-like "polymer" was formed. This gel was collected and dried at 90° C. overnight in an oven, and then subjected to a temperature of 500° C. for 1 hour. The charred material was collected, ground and sintered at 900° C. for 10 hour. The perovskite-type powder of $La_{0.5}Sr_{0.5}Co_{0.5}Fe_{0.5}O_{3-\delta}$ was thus produced. Its XRD pattern is shown in FIG. 2.

EXAMPLE 3

Figure 3:
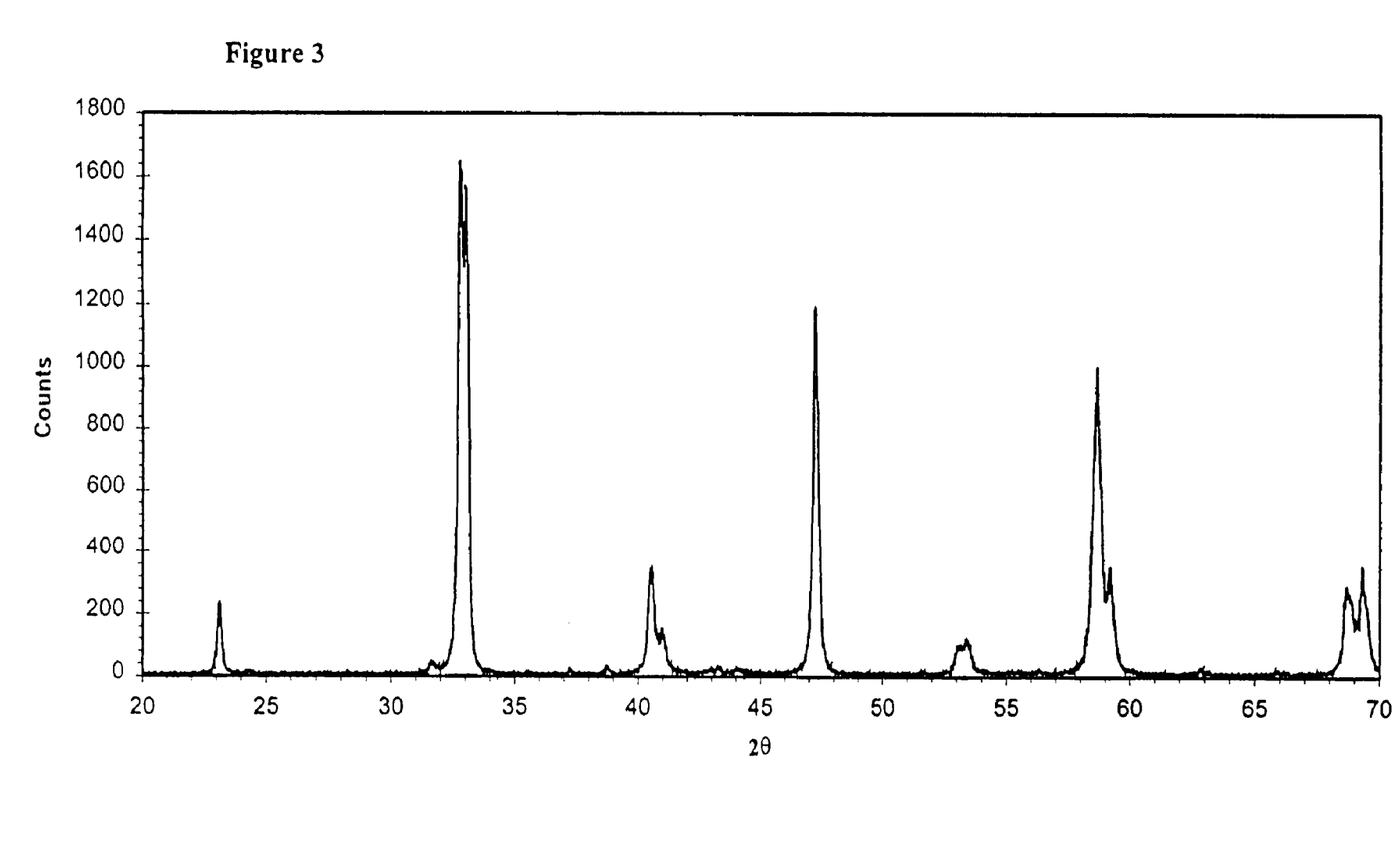
FIG. 3 shows an XRD pattern of the perovskite-type powder formed according to Example 3.

Preparation of 20 g $La_{0.8}Sr_{0.2}Co_{0.4}Ni_{0.4}Fe_{0.2}O_{3-\delta}$ Perovskite-type Oxide by Combustion Synthesis Method The preparation was started by dissolving 29.5 g $La(NO_3)_3.6H2O$, 3.60 g $Sr(NO_3)_2$, 9.91 g $Ni(NO_3)2.6H2O$, 9.91 g $Co(NO_3)_2.6H2O$, and 6.88 g $Fe(NO_3)_3.9H2O$ into 400 ml deionised water. 32.0 g glycine ($H_2NCH_2CO_2H$) was then added to the above-made solution. This solution was heated up to 90–100° C. while stirring for about 3 hours with reflux. The water was then evaporated and a concentrated solution of about 100 ml was obtained, which was transferred into an alumina crucible and placed into a box furnace pre-heated at 250° C. The solution was further concentrated and formed a gel-like material, which was quickly combusted as the furnace temperature was increased to 400° C. The residue was collected and ground into powder. This powder was then sintered at 900° C. for 8 hours. The perovskite-type powder of $La_{0.8}Sr_{0.2}Co_{0.4}Ni_{0.4}Fe_{0.2}O_{3-\delta}$ was thus produced. Its XRD pattern is shown in FIG. 3.

EXAMPLE 4

Figure 4:
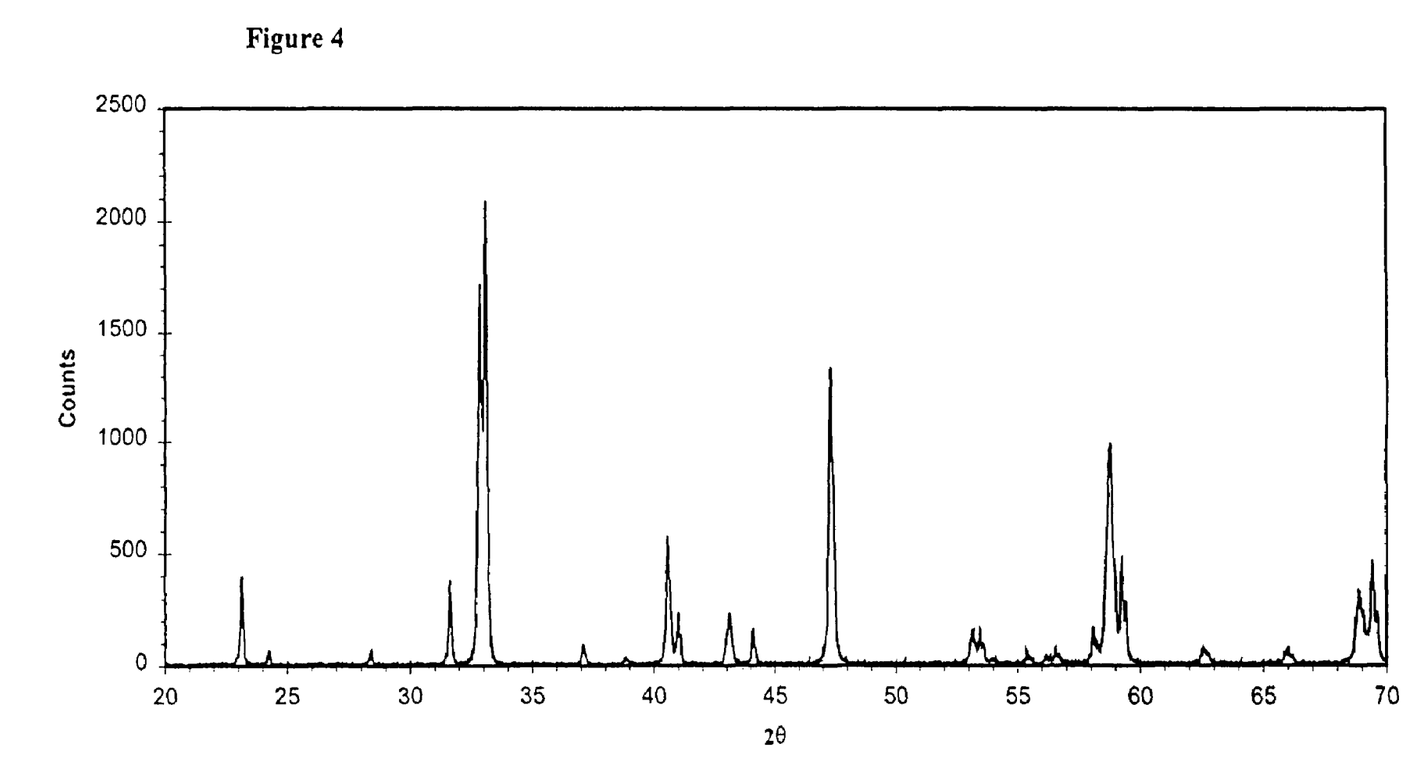
FIG. 4 shows the perovskite-type phase structure of the perovskite-type oxide formed according to Example 4.

Preparation of 500 g $La_{0.8}Sr_{0.2}Co_{0.4}Ni_{0.4}Fe_{0.2}O_{3-\delta}$ Perovskite-type Oxide by Solid State Reaction Method The powder of perovskite-type oxide was prepared first by mixing of corresponding metal oxides and then under repeated steps of sintering, ball-milling and filtration for three times. The sintering steps lasted for 8 hours at ramp and cooling rates of 3° C./min. The sintering temperatures in 3 repeat steps were, respectively, 1000° C., 1250° C. and 1300° C., and the sintering time was 8 hours. The first sintering was conducted right after dry-mixing of $La_2O_3$, $Sr(OH)_2 8.H_2O$, $Ni_2O_3$, $Co_2O_3$ and $Fe_2O_3$. The ball milling of the material was carried out with grinding the media and water after each sintering. The solid was collected by filtration after ball milling. The filtration cake was dried at 100° C. over night before it was subjected to the next sintering. After the last ball-milling, the dried filtration cake was crushed and ground into fine powder. The powder had a perovskite-type phase structure as shown in FIG. 4.

EXAMPLE 5

Fabrication of $La_{0.8}Sr_{0.2}Co_{0.4}Ni_{0.4}Fe_{0.2}O_{3-\delta}$ Perovskite-type Oxide Extrudates Without Support The perovskite-type oxide powder made in Example 4 was transferred into a slurry after addition of about 5 wt % hydroxyethyl cellulose and 14.5 wt % water. The cellulose was added first and well mixed with the solid. Water was then sprayed in, little by little, with intermediate stirring and mixing to preserve the homogeneity of the mixture and to avoid agglomeration. Thus obtained slurry was aged overnight before it was loaded into an extruder and transformed into extrudates (⅛" diameter and ¼" long). The extrudates were dried in an oven at 90° C. for about 2 hr. They were then heated at 3° C./min to 600° C. and kept at this temperature for 5 hr. After the cellulose was burned out, the extrudates were further sintered at 1350° C. for 8 hours. The final product of $La_{0.8}Sr_{0.2}Co_{0.4}Ni_{0.4}Fe_{0.2}O_{3-\delta}$ extrudes appeared to be dense and mechanically strong.

EXAMPLE 6

Fabrication of 50 wt % alpha-$Al_2O_3$ Supported $La_{0.8}Sr_{0.2}Co_{0.4}Ni_{0.4}Fe_{0.2}O_{3-\delta}$ Perovskite-type Oxide Extrudates with Support The perovskite-type oxide powder made in Example 4 was well mixed with equal amount of alpha-$Al_2O_3$ powder (100 mesh). The mixture was then sintered at 1300° C. for 8 h with ramp and cooling rates of 3° C./min. After sintering, the color of the mixture changed from black to dark blue. The resulting powder was turned into a slurry after addition of about 5 wt % hydroxyethyl cellulose and 20.5 wt % water. The cellulose was added first and well mixed with the solid. Water was then sprayed in, little by little, with intermediate stirring and mixing to preserve the homogeneity of the mixture and to avoid agglomeration. Thus obtained slurry was aged overnight before it was loaded into an extruder and transformed into extrudates (1/8" diameter and 1/4" long). The extrudates were dried in an oven at 90° C. for about 2 hr. They were then heated at 3° C./min to 600° C. and held at this temperature for 5 hr. After cellulose was burned out, the extrudates were further sintered at 1350° C. for 8 h. The final product of 50 wt % LSNCF-82442/alpha-$Al_2O_3$ extrudes appeared to be porous and mechanically strong.

EXAMPLE 7

Fabrication of 30 wt % alpha-$Al_2O_3$ and 10 wt % gamma-Al2O3 Supported $La_{0.8}Sr_{0.2}Co_{0.4}Ni_{0.4}Fe_{0.2}O_{3-\delta}$ Perovskite-type Oxide Extrudates with Support The perovskite-type oxide powder made in Example 4 was well mixed with alpha-$Al_2O_3$ powder (100 mesh) at a ratio of 6:3 by weight. The mixture was sintered at 1050° C. for 8 h with ramp and cooling rates of 3° C./min. After sintering, the color of the mixture changed from black to dark blue. The resulting powder was well mixed with gamma-Al2O3 at a ratio of 9:1 by weight. The mixture was then turned into a slurry after addition of about 5 wt % hydroxyethyl cellulose and 20.5 wt % water. The cellulose was added first and well mixed with the solid. Water was then sprayed in, little by little, with intermediate stirring and mixing to preserve the homogeneity of the mixture and to avoid agglomeration. Thus obtained slurry was aged overnight before it was loaded into an extruder and transformed into extrudates (1/8" diameter and 1/4" long). The extrudates were dried in an oven at 90° C. for about 2 hr. They were then heated at 3° C./min to 600° C. and held at this temperature for 5 hr. After cellulose was burned out, the extrudates were further sintered at 1350° C. for 8 h. The final product of 60 wt % LSNCF-82442/30 wt % alpha-$Al_2O_3$/10 wt % gamma-Al2O3 extrudes appeared to be porous and mechanically strong.

EXAMPLE 8

Comparison of the Performance of Unsupported and Supported $La_{0.8}Sr_{0.2}Co_{0.4}Ni_{0.4}Fe_{0.2}O_{3-\delta}$ Perovskite-type Oxide Extrudates for Cyclic Auto-thermal Reforming (CAR) Process 200 cc of unsupported and alpha-$Al_2O_3$-supported $La_{0.8}Sr_{0.2}Co_{0.4}Ni_{0.4}Fe_{0.2}O_{3-\delta}$ perovskite-type oxide extrudates prepared in Example 5 and Example 6 were loaded separately in a fixed bed reactor for two comparison experiments. For cyclic auto-thermal reforming process, a flow of air and a flow of methane/steam mixture were fed alternately into the reactor. Oxygen was retained by the perovskite-type oxide during the air step in the form of solid phase lattice oxygen, which was reacted with methane/steam mixture in the subsequent step to form a product containing hydrogen and carbon monoxide. Table 1 gives the results of the experiments over unsupported and supported extrudates. As shown in the table, the supported extrudates had much higher methane conversion and hydrogen and carbon monoxide concentration in the product.

TABLE 1

CAR Process over LSNCF-82442 with and without Support

| Furnace Temp. | H2O/ | Product Composition (%) | | | Carbon | Conversion | | ($H_2$ + CO)/$CH_4$ | |
|---|---|---|---|---|---|---|---|---|---|
| ° C. | CH4 | $H_2$ | $CH_4$ | $CO_2$ | CO | Balance | $CH_4$ | $H_2O$ | Real | Ideal |
| 50 wt % LaSrNiCoFe-82442/$Al_2O_3$ | | | | | | | | | | |
| 825 (Co) | 2.1 | 69.0 | 3.22 | 8.65 | 19.1 | 3.17 | 89.6 | 17.1 | 2.84 | 3.17 |
| 825 (Re) | 2.1 | 68.2 | 3.66 | 9.58 | 18.6 | −6.18 | 88.5 | 11.3 | 2.73 | 3.08 |
| 825 (Co) | 1.5 | 67.3 | 4.52 | 7.25 | 20.9 | −1.57 | 86.2 | 20.4 | 2.70 | 3.13 |
| 825 (Re) | 1.5 | 66.0 | 4.60 | 8.48 | 20.9 | −2.26 | 86.4 | 11.1 | 2.55 | 2.95 |
| 800 (Co) | 2.1 | 66.5 | 5.37 | 7.46 | 20.6 | −1.02 | 83.9 | 19.4 | 2.60 | 3.10 |
| 800 (Re) | 2.1 | 65.7 | 5.41 | 8.55 | 20.3 | −1.42 | 84.2 | 13.9 | 2.51 | 2.98 |
| 800 (Co) | 2.1 | 66.3 | 5.87 | 7.25 | 20.5 | 0.18 | 82.6 | 21.7 | 2.58 | 3.13 |
| Pure LaSrNiCoFe-82442 perovskite | | | | | | | | | | |
| 800 (Co) | 2.1 | 64.5 | 9.0 | 12.5 | 14.0 | 0.9 | 74.8 | 16.2 | 2.2 | 3.0 |
| 800 (Re) | 2.1 | 62.7 | 10.7 | 12.6 | 13.9 | 0.6 | 71.2 | 12.9 | 2.1 | 2.9 |
| 800 (Co) | 3.3 | 61.8 | 11.4 | 14.7 | 12.1 | 2.7 | 70.1 | 7.7 | 1.9 | 2.8 |
| 800 (Re) | 3.3 | 59.8 | 13.5 | 14.7 | 12.0 | 0 | 66.4 | 4.8 | 1.8 | 2.7 |

Note
ideal ($H_2$ + CO)/$CH_4$ was under assumption of 100% $CH_4$ conversion
Co: Co-current flow;
Re: Reverse flow While this invention has been described with respect to particular embodiments thereof, it is apparent that numerous other forms and modifications of the invention will be obvious to those skilled in the art. The appended claims in this invention generally should be construed to cover all

Having thus described the invention, what we claim is:

1. A method for converting hydrocarbons by cyclic autothermal reforming into hydrogen and carbon monoxide by contacting alternately air and a hydrocarbon/steam mixture with a composition comprising a supported perovskite-type oxide having a general formula $A_xA'_{x'}B_yB'_{y'}O_{3-\delta}$, wherein:

A is an ion of a metal of Group IIIa or IIIb of the periodic table of elements or mixtures of these;

A' is an ion of a metal of Groups Ia or IIa of the periodic table of elements or mixtures of these;

B and B' are ions of a d-block transition metal of the periodic table of elements or mixtures of these;

x, x', y and y' range from 0 to 1.05;

$0.95 < x+x' < 1.05$;

$0.95 < y+y' < 1.05$; and $\delta$ is the deviation from ideal oxygen stoichiometry;

wherein said supported perovskite-type oxide provides oxygen storage capability.

2. The method as claimed in claim 1 wherein A is an La ion, A' is an Sr ion; and B and B' are selected from the group consisting of Ni, Co and Fe ions in said composition.

3. The method as claimed in claim 1 wherein said supported perovskite-type oxide has the formula $La_xSr_{x'}Ni_yCo_{y'}Fe_{y''}O_{3-\delta}$, wherein x, x', y, y' and y'' are all smaller than 1.05 but greater than 0.

4. The method as claimed in claim 3 wherein $0.5 < x < 1$, $0.1 < x' < 0.5$, $0.2 < y < 0.8$, $0.2 < y' < 0.6$ and $0.1 < y'' < 0.5$.

5. The method as claimed in claim 1 wherein said perovskite-type oxide has particle sizes in the range of about 0.01 to 100 microns.

6. The method as claimed in claim 1 wherein said perovskite-type oxide has particle sizes in the range of about 0.1 to 50 microns.

7. The method as claimed in claim 1 wherein said support is selected from the group consisting of porous inorganic materials, which are stable at temperatures in the range of 600–1200° C.

8. The method as claimed in claim 1 wherein said support is selected from the group consisting of: (1) metal oxides; (2) aluminates; (3) metal aluminum silicates, and (4) metals.

9. The method as claimed in claim 8 wherein said metal oxides are selected from the group consisting of alpha-$Al_2O_3$, gamma-$Al_2O_3$, eta-$Al_2O_3$, $ZrO_2$, $TiO_2$, $MgO$, $CeO_2$, $CaO$ and $SiO_2$.

10. The method as claimed in claim 8 wherein said aluminate is selected from the group consisting of $MgAl_2O_4$ and $CaAl_2O_4$.

11. The method as claimed in claim 8 wherein said metal aluminum silicate is a cordierite.

12. The method as claimed in claim 8 wherein said metal is a porous high nickel containing alloy.

13. The method as claimed in claim 1 wherein said support is selected from the group consisting of alpha-$Al_2O_3$, gamma-$Al_2O_3$ and eta-$Al_2O_3$ and mixtures of these.

14. The method as claimed in claim 1 wherein said support is selected from the group of cordierites consisting of $Mg_2Al_3[AlSi_5O_{18}]$ and $Fe_2Al_3[AlSi_5O_{18}]$.

15. The method as claimed in claim 1 wherein said support is $MgAl_2O_4$.

16. The method as claimed in claim 1 wherein said support has particle sizes in the range of about 1 to 10,000 microns.

17. The method as claimed in claim 1 wherein said support has particle sizes in the range of about 10 to 1,000 microns.

18. The method as claimed in claim 1 wherein said composition is prepared by dispersing perovskite-type oxides onto the selected support with or without the aid of a liquid solvent; and treating the mixture of perovskite-type oxide and support at a temperature of 600–1,500° C.

19. The method as claimed in claim 1 wherein said supported perovskite-type oxide has the shape selected from the group consisting of beads, rings, extrudates with any cross sectional shapes with or without holes, honey-comb with uniform channels and monolith with random porosity and foam structure.

20. The method as claimed in claim 19 wherein said shape is selected from the group consisting of monolith and extrudates with cylindrical shape.

21. The method as claimed in claim 1 wherein said composition further comprises additives used in the forming process to control the pore structure wherein said additives are selected from the group consisting of water, organic solvents, cellulose, polymers, synthetic and naturally formed fibers, starch and metal oxides.

22. The method as claimed in claim 21 wherein said additives are selected from the group consisting of water, cellulose, about 0.1 to 1 wt % MgO and about 0.1 to 0.5 wt % $TiO_2$.

23. The method as claimed in claim 1 wherein said composition has pore sizes in the range of about 0.001 to 10 microns, and surface area in the range of 1 to 200 $m^2/g$.

24. The method as claimed in claim 1 wherein said composition is coated on one or more support materials.

25. The method as claimed in claim 1 wherein said composition is further coated or impregnated with metals selected from the group consisting of transition and noble metals selected from the group consisting of Rh, Pt, and Ag.

26. The method as claimed in claim 23 wherein said composition has pore size in the range of 0.01–1 microns and surface area in the range of 1 to 50 m2/g.

27. The method as claimed in claim 1, which is formed by extrusion.

28. The method as claimed in claim 27 wherein said extrusion is performed using screw extrusion methods.

29. The method as claimed in claim 1, wherein said composition is formed by pressing procedures.

* * * * *